(12) United States Patent
Walter et al.

(10) Patent No.: US 7,707,813 B2
(45) Date of Patent: May 4, 2010

(54) METHOD OF PRODUCING A HOUSING FOR A MOWER CUTTER BAR AND HOUSING THUS PRODUCED

(75) Inventors: Rene Walter, Goetzenbruck (FR); Jacky Kirch, Otterswiller (FR)

(73) Assignee: Kuhn S . A ., Saverne (FR)

( * ) Notice: Subject to any disclaimer, the term of this patent is extended or adjusted under 35 U.S.C. 154(b) by 95 days.

(21) Appl. No.: 11/817,924

(22) PCT Filed: Mar. 1, 2006

(86) PCT No.: PCT/FR2006/050186

§ 371 (c)(1),
(2), (4) Date: Sep. 6, 2007

(87) PCT Pub. No.: WO2006/095106

PCT Pub. Date: Sep. 14, 2006

(65) Prior Publication Data

US 2008/0168758 A1    Jul. 17, 2008

(30) Foreign Application Priority Data

Mar. 8, 2005    (FR)    .................................. 05 50603

(51) Int. Cl.
*A01D 67/00* (2006.01)
(52) U.S. Cl. .......................................... 56/320.1; 56/6
(58) Field of Classification Search ........................ 56/6, 56/320.1
See application file for complete search history.

(56) References Cited

U.S. PATENT DOCUMENTS

| | | | | |
|---|---|---|---|---|
| 4,633,656 | A | * | 1/1987 | Willinger ..................... 56/13.6 |
| 4,737,612 | A | * | 4/1988 | Bruck et al. ........... 219/121.64 |
| 4,738,328 | A | | 4/1988 | Hayden |
| 5,012,634 | A | * | 5/1991 | Walters et al. ............... 56/13.6 |
| 5,212,936 | A | | 5/1993 | Lauritsen |
| 5,221,585 | A | | 6/1993 | Kresse et al. |
| 5,715,662 | A | * | 2/1998 | Walters ........................... 56/6 |
| 5,964,079 | A | * | 10/1999 | Mellin et al. ................ 56/13.6 |
| 6,052,980 | A | | 4/2000 | Friesen |

FOREIGN PATENT DOCUMENTS

FR    2 255 835    7/1975

* cited by examiner

*Primary Examiner*—Alicia M Torres
(74) *Attorney, Agent, or Firm*—Oblon, Spivak, McClelland, Maier & Neustadt, L.L.P.

(57) ABSTRACT

A method of producing a disk mower cutter bar housing and the housing produced. The method forms an upper plate and a lower plate of a housing, assembles the formed upper plate and the formed lower plate by welding to form a casing, and cuts out holes on the casing, by a laser beam. The holes are configured to receive bearings of disks and intermediate drive gears.

9 Claims, 3 Drawing Sheets

METHOD OF PRODUCING A HOUSING FOR A MOWER CUTTER BAR AND HOUSING THUS PRODUCED

The invention relates to a method of producing a disk mower cutter bar housing and the housing produced.

Disk mowers comprise a cutter bar of considerable dimension that can go up to more than four meters and that has multiple rotary disks whose function is the cutting of the plants.

The disks are mounted on bearings arranged at more or less regular intervals on the cutter bar. These disks are driven in rotation by means of a gear train incorporated in a tight housing containing a lubricant such as oil.

The gear train is actuated by transmission means capable of transmitting the energy necessary from the carrying vehicle, usually a tractor, to the housing.

It is important that the housing is relatively light and flexible for better following the unevennesses of the ground. It must also be perfectly tight both in order to avoid leaks of lubricant and to prevent the penetration of external particles into the gear train.

Leaks of lubricant would cause premature wear of the gears and pollution of the environment. The entry of cutting debris and dust into the casing could cause premature wear of the gears and reduced mechanical efficiency.

According to a current production technique, the cutter bar casing of a mower is in the form of an elongated parallelepiped manufactured by assembling two long formed plates or two plates stamped in order to give them the shape of the housing.

Before assembly of the two plates, said plates undergo a first pre-cutting or pre-punching operation at the locations where the disk bearings and the intermediate drive gears will be mounted.

According to a first embodiment, the two portions are then assembled by welding with addition of material and finally machined to the final dimensions of the holes for mounting the disk bearings and the intermediate drive gears.

According to another embodiment, the two plates are assembled by means of tightening bolts. In this case, the plates are pierced on their periphery with through-holes for tightening bolts and then the holes for mounting the disk bearings and the intermediate drive gears are machined to the final dimensions.

These methods comprise a large number of operations which require considerable production time.

Furthermore, in the conventional arc welding technique, a large quantity of heat is applied to the parts to be assembled. This quantity of heat extends over a wide zone around the surface to be welded and often causes considerable deformations on the parts to be assembled.

These deformations may be reduced, and even controlled, but this requires costly actions and scrapped parts are to be feared all the same.

Specifically, deformations of the housing may cause various problems for the operation of the gear train and of the mower itself, so these deformations should be limited as much as possible.

The conventional arc welding technique therefore requires that major precautions are taken and in the end results in a quality that is very much associated with the know-how of the operator and difficult to control. They also require a rework to machine the holes for mounting the disk bearings and intermediate drive gears to the final dimensions.

The object of the invention is to simplify the production of disk mower cutter bar housings.

Accordingly, the invention relates to a method of producing a disk mower cutter bar housing and the housing produced, characterized by the following successive steps:

forming an upper metal plate and a lower metal plate of the housing, assembling the formed upper plate and the formed lower plate by welding in order to form a casing, cutting out holes on the casing, by means of a laser beam, said holes being intended to receive the bearings of the disks and the intermediate drive gears, closing the two ends of the casing.

The method of producing a disk mower cutter bar housing and the housing produced according to the invention have many advantages over the known technique.

This new method comprises fewer operations, so the housings are manufactured more quickly.

Identical housings are produced from one manufacture to another.

Laser beam cutting is precise and reliable. It allows the production of holes exactly to the desired dimension and an extremely satisfactory machining, without a later rework operation being necessary. In addition it applies a light heat treatment of the surface of the cut bore.

Laser cutting allows the production of complex holes, where necessary allowing the use of non-standard parts.

The method allows both the use of plates pre-cut to the length of the mower cutter bar before the manufacture of the housing and the use of standard plates, for example 6 meters long, that are cut to the desired dimension according to requirements only after they have been assembled and if necessary after the holes have been cut out by a laser beam.

According to another feature, the formed upper plate and the formed lower plate are assembled by welding by means of a laser beam without addition of material. Laser welds do not require addition of material and cause practically no deformations on the parts to be assembled. The welds are therefore easily reproducible and extremely precise.

Other features and advantages of the invention will emerge from the following description with reference to the appended drawings that are given only as nonlimiting examples.

According to the invention, the housing of the disk mower cutter bar consists of two metal plates formed in a forming operation prior to their assembly.

Figure 1:
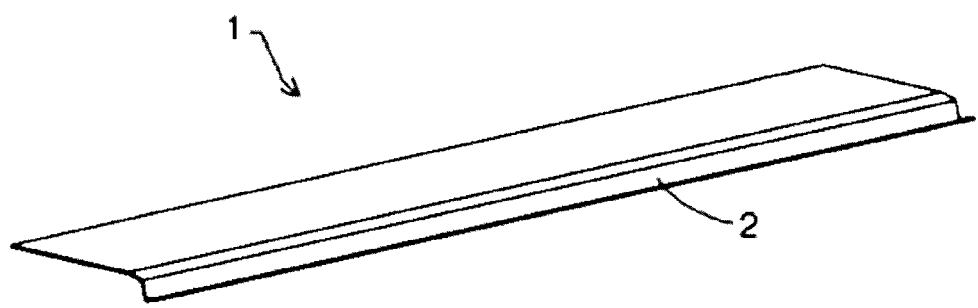
FIG. 1 represents a view in perspective of the formed upper plate.

FIG. 1 represents the formed upper plate 1 of the housing, having a portion bent down intended to form the rear edge 2 of the housing.

Figure 2:
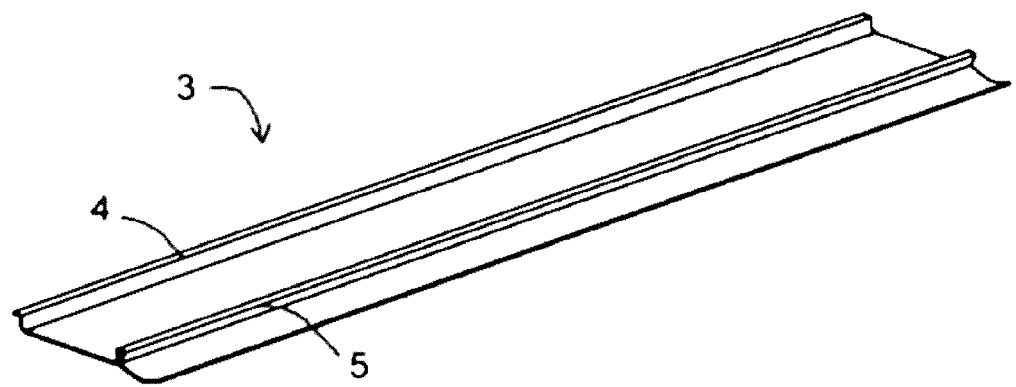
FIG. 2 represents a view in perspective of the formed lower plate.

FIG. 2 illustrates the formed lower plate 3 of the housing comprising in particular a front edge 4 bent up. Advantageously it has a substantially vertical partition 5 obtained by bending. The latter is situated close to the rear part of the housing in order to increase its rigidity and to limit the volume in which the drive gears are situated. This volume limitation makes it possible, for example, to reduce the quantity of lubricant necessary for said gears to operate correctly.

The two plates, the lower plate 3 and the upper plate 1, are brought into contact with one another so that the front part of the upper plate 1 rests on the flat of the front edge 4 of the lower plate 3, and so that the rear edge 2 rests on the lower plate 3.

Figure 3:
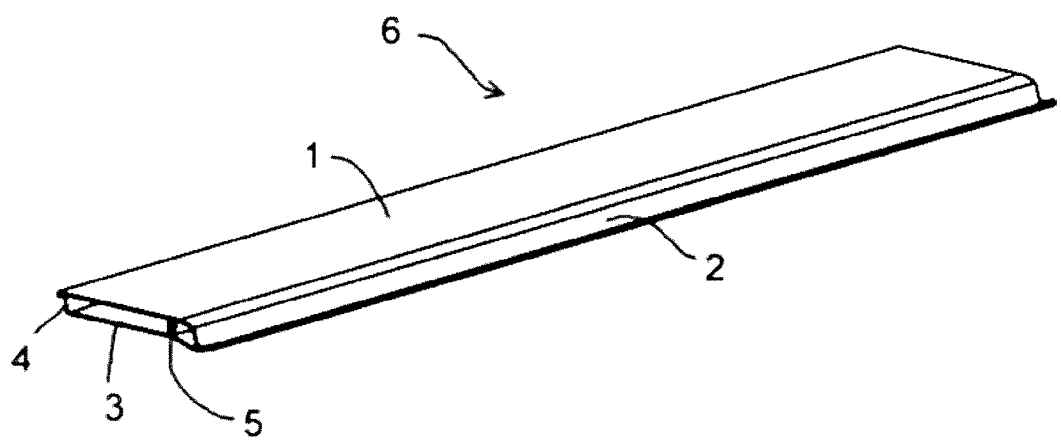
FIG. 3 represents the two formed plates assembled by laser welding.

FIG. 3 shows the assembly of the formed upper and lower plates by means of a laser beam weld, without addition of material, which leads to the formation of the casing 6 of the housing. The welding is carried out continuously over the complete length of the plates at the lines of contact of the rear edge 2 and the front edge 4.

The casing 6 thus formed by welding is of generally parallelepipedal shape with an internal partition 5 and two open laterals ends.

The welding is carried out by placing the two parts of the formed plates in contact and by pressing and then focusing a high-energy laser beam on the interface between said two parts to be assembled in order to heat them and melt the metals.

With a laser beam, a high energy is focused on a small surface which causes the localized fusion at the interface of the two parts in contact and the diffusion of material. This diffusion of material allows the creation of the link between the two metal parts and therefore a tight weld during cooling.

Figure 4:
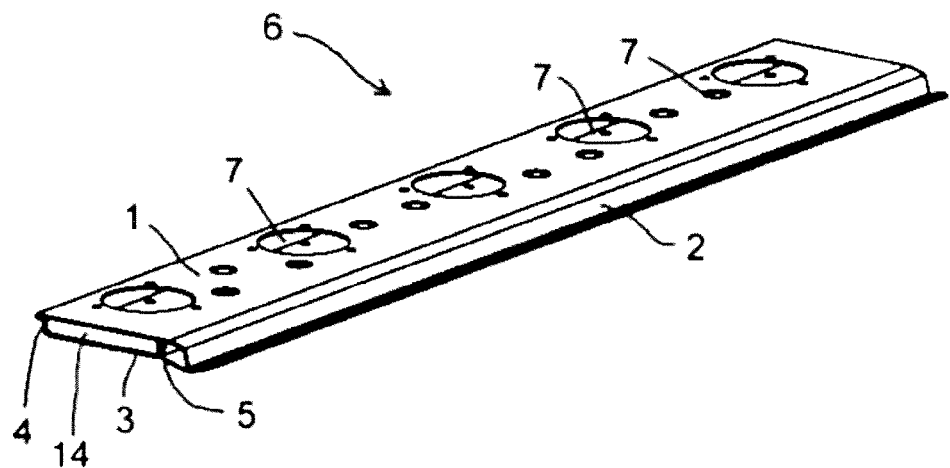
FIG. 4 represents the two plates assembled and cut with a laser beam, the housing being closed at the two ends.

Once the casing 6 has been created, the method according to the invention proposes to make holes 7 by cutting out with a high-energy laser beam into the casing 6. FIG. 4 shows several holes 7 cut into said casing 6.

These holes 7 are intended to receive the bearings 10 of the mowing disks 8 of the mower and the intermediate drive gears 12.

Cutting by laser beam has the advantage of an extremely clean cut with a smooth appearance which makes subsequent machining unnecessary.

The extreme accuracy of the cut allows a precise adjustment of the complementary elements added and therefore the production of an assembly that can be easily sealed.

In a last step, the ends of the casing are closed, by welding fitted lateral edges 14. These lateral edges may be welded in a conventional manner with addition of material or by laser beam welding.

Figure 5:
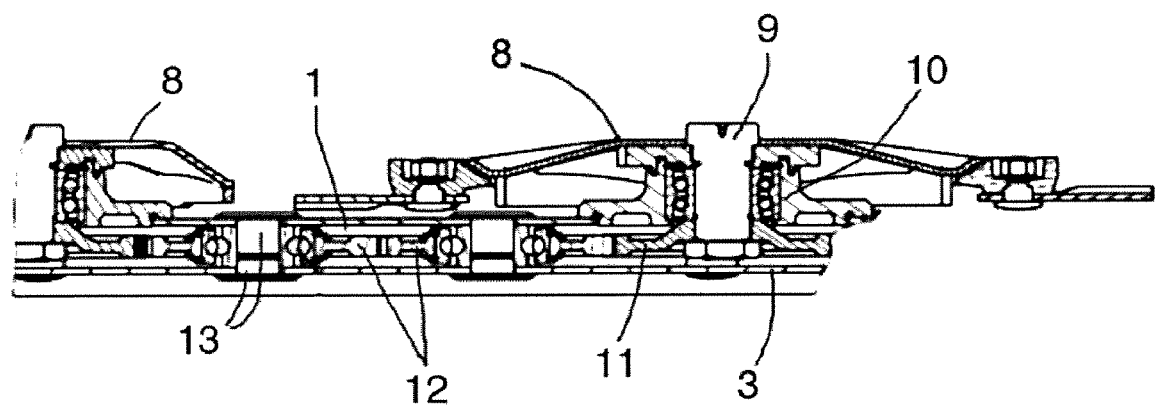
FIG. 5 represents a longitudinal section of the cutter bar with some disks and some drive gears.

FIG. 5 illustrates a housing according to the invention in a view in section with mowing disks 8 that are connected to shafts 9 housed in bearings 10 that are attached to the upper plate 1 of the housing by means of through-screws. Each shaft 9 supports, at its end situated in the housing, a drive gear 11 which meshes with intermediate gears 12 that are mounted rotatably on supports 13 fixedly attached to the upper plate 1 and lower plate 3 of the housing. Said drive gears 11 and 12 therefore provide rotational drive to all the disks 8 of the cutter bar. At the bearings 10 and supports 13, seals are placed which ensure a perfect tightness of the housing in order to prevent losses of lubricant and the penetration of foreign bodies.

The various steps of the method allow an appreciable time-saving for the manufacture of a housing and of the complete cutter bar of a mower.

The many advantages inherent in the method, particularly the speed, the great precision and the good quality of laser welding and of laser cutting, allow a marked improvement in the cost price of manufacturing the housing, which housing is produced with great precision and high reproducibility.

The invention also relates to the disk mower cutter bar housing produced by assembling and welding a formed upper plate 1 and a formed lower plate 3 in order to have a casing 6 on which are cut out, by means of a laser beam, holes 7 intended to receive bearings 10 of disks 8 and supports 13 of intermediate drive pinions 12.

The formed plates 1 and 3 are assembled by welding by means of a laser beam, without addition of material. Finally, the ends of the casing 6 are closed by welding, either in a conventional manner with addition of material or by laser beam, with fitted lateral edges 14.

Several variants are possible for the method of manufacturing the cutter bar housing of a mower without departing from the context of the invention.

In particular cutting the housing to the length of the mower cutter bar may be envisaged after manufacturing the casing and even after cutting out the holes. That is to say that formed parts of greater or lesser size may be employed to produce the casing, the cutting to the length of the mower cutter bar being achieved as a last manufacturing step just before closing the ends of the casing.

Cutting the formed plates to its length may also be envisaged before assembly of the casing without departing from the scope of the invention. As a variant, cutting the plates intended for the manufacture of the formed plates to its length may be achieved before forming.

This cutting of the housing casing, of the plates or of the formed plates themselves can be carried out in the conventional manner or preferably by laser beam cutting.

The invention is not limited to the embodiments described and represented as examples, but it also includes all the technical equivalents and their combinations.

The invention claimed is:

1. A method of producing a disk mower cutter bar housing, comprising:
    forming an upper plate and a lower plate of the housing;
    assembling the formed upper plate and the formed lower plate by welding by a laser beam, without addition of material, to form a casing;
    cutting out holes on the casing, by a laser beam, the holes configured to receive bearings of disks and supports of intermediate drive gears;
    closing two ends of the formed casing with fitted lateral edges, by welding with addition of material,
    wherein the forming of the lower plate comprises forming a front edge and bending the lower plate to form a vertical partition parallel to said front edge, said vertical partition being between said front edge and a rear part of the lower plate.

2. The method of producing a disk mower cutter bar housing as claimed in claim 1, wherein the upper plate and the lower plate that form the casing of the housing are cut to a length of the mower cutter bar before the forming.

3. The method of producing a disk mower cutter bar housing as claimed in claim 2, wherein the housing is cut to a length of the cutter bar by a laser beam.

4. The method of producing a disk mower cutter bar housing as claimed in claim 1, wherein the housing is cut to a length of the mower cutter bar after forming the casing.

5. The method of producing a disk mower cutter bar housing as claimed in claim 4, wherein the housing is cut to the length of the cutter bar by a laser beam.

6. The method of producing a disk mower cutter bar housing as claimed in claim 1, wherein the housing is cut to a length of the mower cutter bar after forming the casing and after cutting out the holes.

7. The method of producing a disk mower cutter bar housing as claimed in claim 6, wherein the housing is cut to the length of the cutter bar by a laser beam.

8. The method of producing a disk mower cutter bar housing as claimed in claim 1, wherein the forming of the upper plate comprises forming a rear edge, wherein the assembling comprises bringing into contact a front part of the upper plate against the front edge of the lower plate and bringing into contact the rear edge of the upper plate against the rear part of the lower plate such that said partition extends between, and parallel to, said front edge and said rear edge, and wherein said assembling further comprises laser welding at lines of contact between the rear edge and the rear part and between the front edge and the front part.

9. A disk mower, comprising a housing as claimed in claim 8.

* * * * *